Feb. 5, 1924.
R. B. WESTHAVER
POWER DUSTING MACHINE
Filed March 9, 1923      3 Sheets-Sheet 3
1,482,495
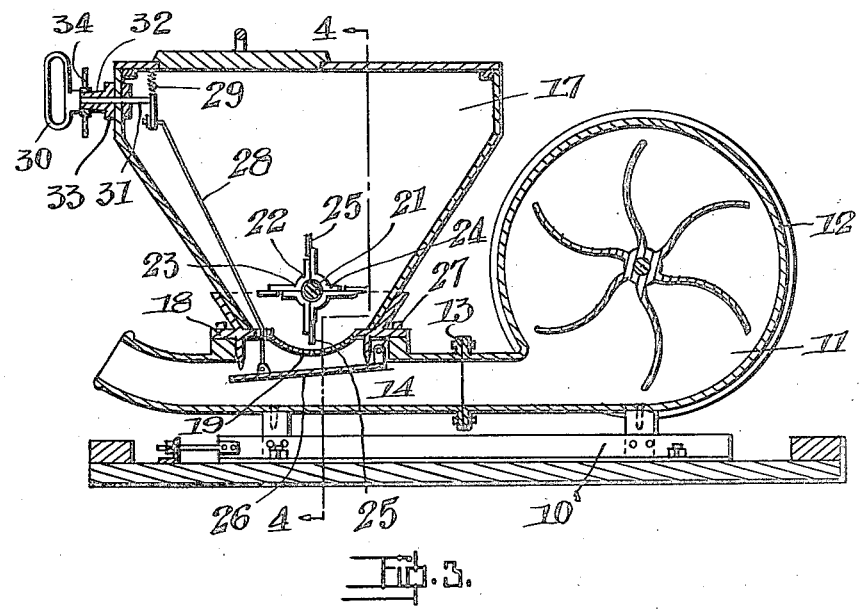
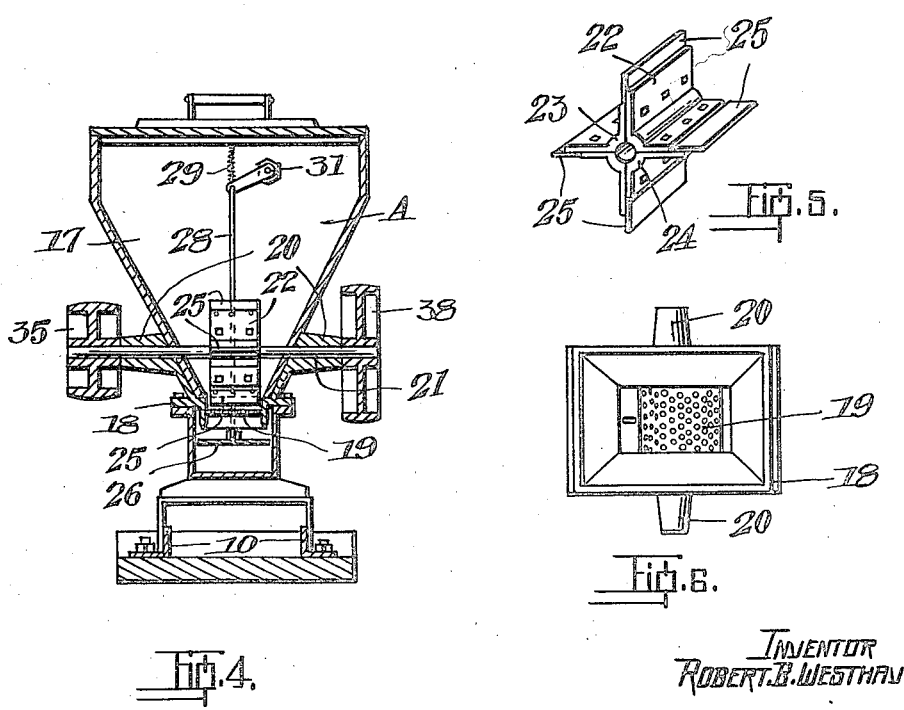

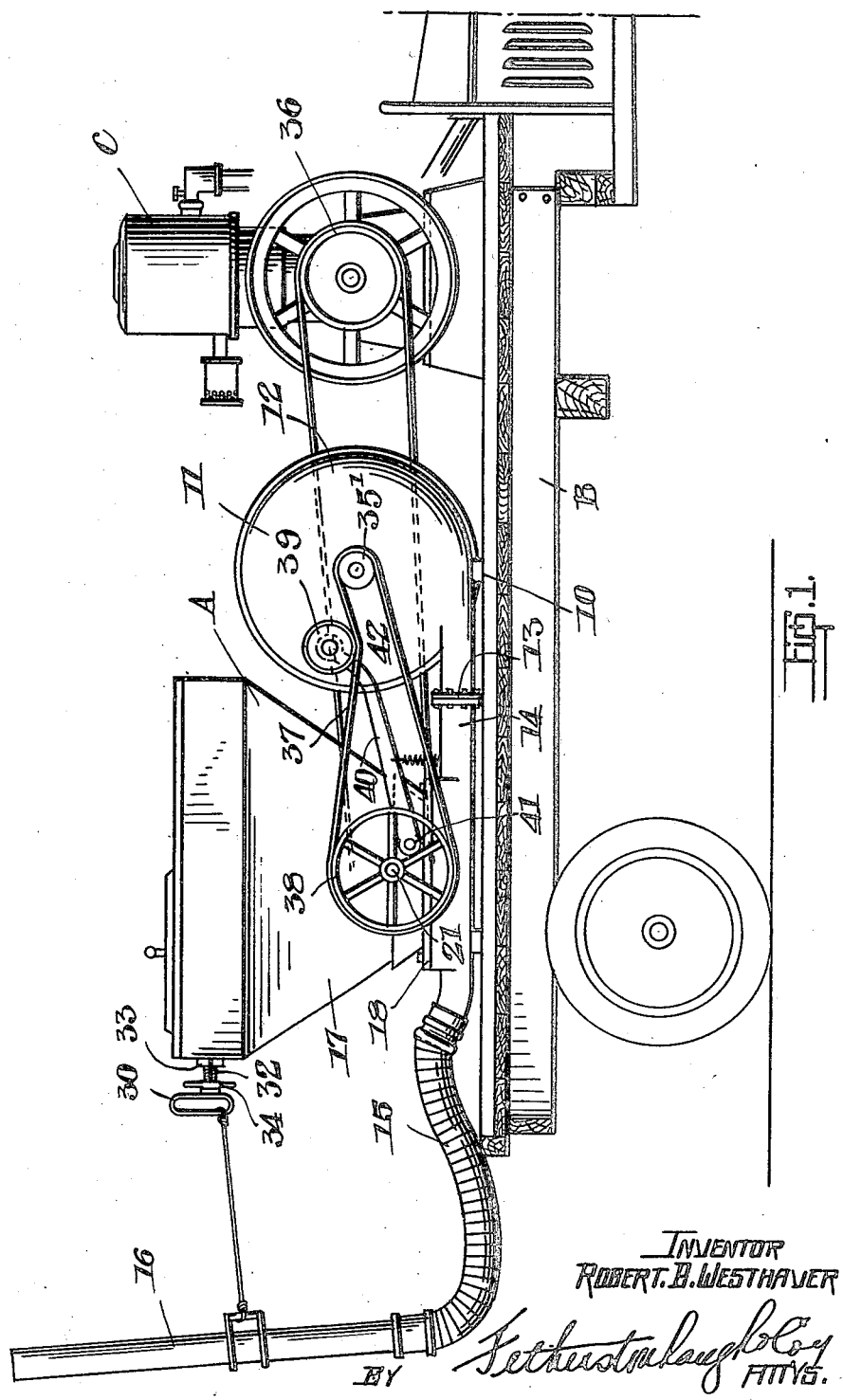

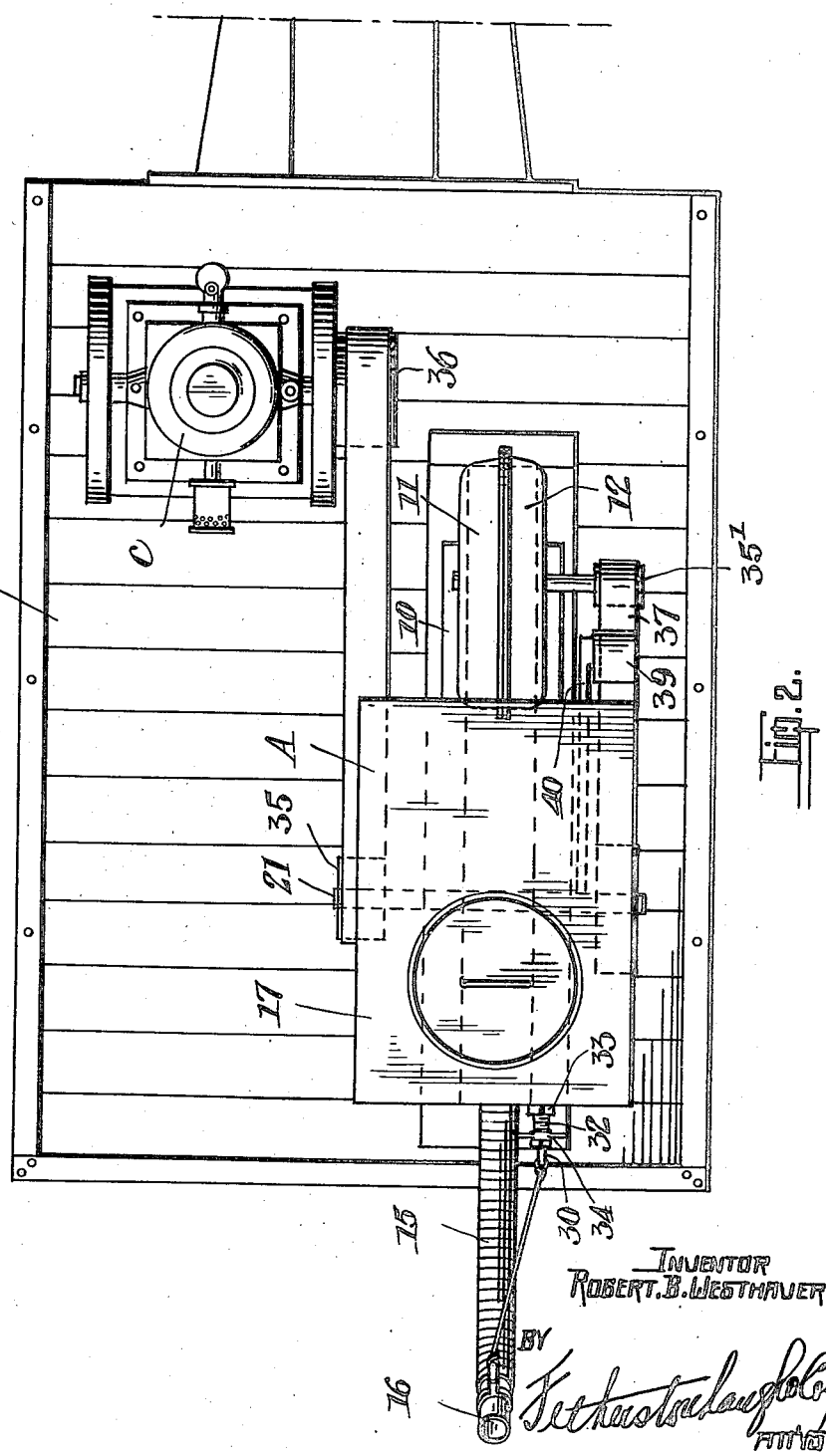

Patented Feb. 5, 1924.

1,482,495

UNITED STATES PATENT OFFICE.

ROBERT BENJAMIN WESTHAVER, OF MAHONE BAY, NOVA SCOTIA, CANADA.

POWER DUSTING MACHINE.

Application filed March 9, 1923. Serial No. 623,888.

*To all whom it may concern:*

Be it known that I, ROBERT BENJAMIN WESTHAVER, a subject of the King of Great Britain, and resident of the town of Mahone Bay, in the Province of Nova Scotia, Dominion of Canada, have invented certain new and useful Improvements in Power Dusting Machines, of which the following is a specification.

This invention relates to improvements in power dusting machines and particularly to machines for blowing dust on trees, vines, field crops, and the like, and the object of the invention is to provide a machine of this character of light, durable and efficient construction for destroying insect pests and the like on crops, trees and vegetation generally by blowing suitably prepared dust thereon.

Further objects are the provision of a dusting machine in which the outflow of dust is so controlled that practically no air is forced up into the dust hopper and further to provide a machine of this kind in which the agitation is operated directly by the drive shaft.

Another object is the provision in a machine of this kind of a perforated base for the hopper, whereby the dust is retained in the hopper until it is sufficiently disintegrated to pass through the perforations in the base.

With these and other objects in view, the invention consists essentially in the novel construction and arrangement of parts as described in the present specification and illustrated by the accompanying drawings that form part of the same.

Referring to the drawings, in which like characters of reference indicate corresponding parts in each figure.

Figure 1 is a side elevation of an embodiment of my invention mounted on a motor truck.

Figure 2 is a top plan view.

Figure 3 is a vertical section.

Figure 4 is a section on line 4—4 of Figure 3.

Figure 5 is an enlarged view of the agitator.

Figure 6 is a plan view of the hopper, showing the perforated base.

In the drawings, A is the device as a whole mounted on a motor truck B provided with power means in the shape of an engine or the like C.

On a suitable base 10 on the truck B is mounted a fan 11 provided with a casing 12 bolted at 13 to a wind pipe 14 provided with a flexible extension 15 having a nozzle pipe 16 adapted to discharge the fan driven dust as required. 17 is the dust hopper designed to fit into the wind pipe 14 and bolted there at 18, while 19 is the perforated base of the hopper 17.

This hopper is of the usual construction and designed to receive the dust to agitate it before being forced into the wind pipe, as hereinafter more fully described.

For the purpose of agitating the dust in the hopper, I provide extensions 20 on each side of the base of the hopper, which are designed to form the bearings for a driving shaft 21 extending through the hopper and having clamped thereon an agitator 22 adapted to rotate with the shaft 21 to disintegrate the dust in the hopper.

This agitator 22 is preferably made in two double pieces 23 and 24 clamping, as above mentioned, on the driving shaft 21 and in such a way that under ordinary conditions they will rotate with the shaft but that under extraordinary conditions, as when coming in contact with an obstacle in the dust, they will slip on the shaft and thus avoid a breakage of the blades.

In other words, for the ordinary operation of tossing the dust in the hopper and breaking the small lumps in it and otherwise, the agitator blades are clamped sufficiently tight on the driving shaft but not so tightly clamped as to resist to breaking point contact with an immovable object in the dust or otherwise.

25 are extension of flexible material, such as leather, for the agitator blades and are designed to sweep over the perforated base 19 to force the dust therethrough.

26 is a flat valve hinged at 27 to the bottom of the perforated base 19 of the hopper and designed to be opened and closed by means of a rod 28 provided with spring retaining means 29 and operable from the top of the hopper by means of a lever or offset handle 30 attached to a spindle 31 running through a gland 32 clamped on the hopper by a nut 33. The end next the handle is tapered and is sawcut whereby when the adjusting nut 34 is screwed tight the spindle will cause the valve to remain open automatically.

The fan and dust hopper agitator are driven from the drive shaft 21 by means of a pulley 35 belt-connected to a pulley on the motor or engine 36, the fan being driven through the pulley 35' and belt 37 connecting with pulley 38.

39 is an idler pulley carried by a movable arm 40 adapted to swing on a bearing 41. 42 is a tension spring between the base and the swinging arm, whereby in combination with the weight of the arm resting on the belt 37 the latter is retained taut.

The belt drive connecting with the engine may be adjusted in any well known way by means of an adjusting screw and nut.

It will be seen from the foregoing that I have invented a simple and effective power dusting machine in which the driving shaft passes through the dust hopper carrying the agitator for the hopper, whereby any lumps are broken in the dust and whereby when broken, in combination with the perforated base of the hopper, the dust is delivered to the wind pipe to be blown therethrough by means of a fan.

The flat valve adapted to close the base of the hopper and when open to partially close the wind pipe prevents the dust blowing back into the hopper and moreover creates a certain suction that helps to take out the dust.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A device of the character described comprising, in combination, a wind pipe connected at one end to a fan and open at the other end, a feed hopper provided with a perforated base plate adapted to fit into said pipe, a driving shaft in said hopper, an agitator on said shaft, means for operating the shaft and the fan simultaneously whereby the dust in the hopper is agitated and blown outwardly through said wind pipe, means for controlling the outflow of said dust comprising a pivotally mounted valve adapted to fit over the hopper base plate, an operating rod provided with spring retaining means and having a handle at the hopper top designed to open and close said valve.

2. In a device of the character described, and in combination, a wind pipe communicating at one end with a fan and open at the other end, a feed hopper provided with a perforated base plate adapted to fit into said pipe, a driving shaft in said hopper, an agitator provided with flexibly tipped blades on said shaft, means for operating the shaft and the fan simultaneously to agitate the dust and spray it through said pipe, means for controlling the outflow of the dust comprising a valve swingingly disposed between the hopper and said pipe, an operating rod extending to the hopper top and provided with spring retaining means and a handle designed to open and close said valve.

In witness whereof I have hereunto set my hand in the presence of two witnesses.

ROBERT BENJAMIN WESTHAVER.

Witnesses:
TRACEY GARFIELD LANTZ,
E. S. RUDOLF.